United States Patent
Khojasteh et al.

(10) Patent No.: US 9,874,944 B2
(45) Date of Patent: Jan. 23, 2018

(54) SYSTEM, METHOD AND DEVICE FOR FOOT-OPERATED MOTION AND MOVEMENT CONTROL IN VIRTUAL REALITY AND SIMULATED ENVIRONMENTS

(71) Applicants: Pedram Khojasteh, Parkville, MD (US); Peymon Khojasteh, Hanover, MD (US)

(72) Inventors: Pedram Khojasteh, Parkville, MD (US); Peymon Khojasteh, Hanover, MD (US)

( * ) Notice: Subject to any disclaimer, the term of this patent is extended or adjusted under 35 U.S.C. 154(b) by 4 days.

(21) Appl. No.: 15/045,959

(22) Filed: Feb. 17, 2016

(65) Prior Publication Data

US 2016/0328028 A1 Nov. 10, 2016

Related U.S. Application Data

(60) Provisional application No. 62/157,918, filed on May 6, 2015.

(51) Int. Cl.

| | |
|---|---|
| *G06F 3/03* | (2006.01) |
| *G06F 3/033* | (2013.01) |
| *A63F 13/24* | (2014.01) |
| *A63F 13/00* | (2014.01) |

(52) U.S. Cl.
CPC ............ *G06F 3/0334* (2013.01); *A63F 13/00* (2013.01); *A63F 13/24* (2014.09)

(58) Field of Classification Search
None
See application file for complete search history.

(56) References Cited

U.S. PATENT DOCUMENTS

| | | | |
|---|---|---|---|
| 6,285,379 B1 | 9/2001 | Gallery | |
| 6,333,733 B1* | 12/2001 | Andersson | G06F 3/0338 345/157 |
| 7,470,218 B2 | 12/2008 | Williams | |
| 2003/0128186 A1 | 7/2003 | Laker | |
| 2006/0012584 A1* | 1/2006 | Vassallo | G06F 3/016 345/184 |
| 2010/0086905 A1 | 4/2010 | Illana Alejandro et al. | |
| 2014/0035888 A1* | 2/2014 | Levasseur | A63F 13/24 345/184 |
| 2016/0014496 A1* | 1/2016 | Kann | G06F 3/01 381/74 |

OTHER PUBLICATIONS

International Search Report and Written Opinion for Int. App.No. PCT/US2016/031115 dated Aug. 18, 2016.

* cited by examiner

*Primary Examiner* — Joseph Haley
(74) *Attorney, Agent, or Firm* — Reem Allos (57) ABSTRACT

A virtual reality device, system and methodology for video games or other applications with a foot-operated controller to allow for hands free three-dimensional movement. The foot-based controller allows users to move in all directions without using their hands, and it accepts input based on specific movements from the user, particularly from the feet, a foot and/or toes of a user. The controller can be wired or wireless for convenience, and makes the user's foot or feet the primary method of input for movement in virtual spaces.

19 Claims, 7 Drawing Sheets

SYSTEM, METHOD AND DEVICE FOR FOOT-OPERATED MOTION AND MOVEMENT CONTROL IN VIRTUAL REALITY AND SIMULATED ENVIRONMENTS

CROSS-REFERENCE TO RELATED APPLICATION

This application claims the benefit of priority to U.S. Provisional Patent Application Ser. No. 62/157,918, filed May 6, 2015, the disclosure of which is incorporated herein by reference.

BACKGROUND OF THE INVENTION

The increasing computational power and the growth of the game industry have engendered rich virtual worlds for exploration and social interaction. These virtual reality (VR) and other simulated environments, such as a computer-generated representation of the real world, present virtual terrain in three dimensions that characters or avatars or objects need to traverse within that artificial environment through translations of physical commands from the user to movement in the simulation along three dimensions.

Most interfaces employed by the VR industry are hand-controlled. However, the ability of a user to fully engage and move inside a virtual environment is hampered by the need for hands to do it.

Indeed, controlling an avatar or object in virtual reality is a major problem facing the ongoing development and proliferation of VR. It is commonly agreed that a true VR experience requires that operators be able to use their hands freely. However, with the majority of current movement solutions requiring an operator to use a hand-held controller or otherwise large expensive equipment, the user experience is made complicated by the artificial interface constraints, consequently limiting the VR experience.

There is, therefore, a present need for an alternative and improved system, device and methodology to allow VR users to better engage the virtual environments.

There is a present need for an improved technique allowing hands-free movement or motion within virtual environments or simulations, thereby permitting the user to better control their interactions through the use of their now-free hands, something currently absent in the consumer market.

There is a present need for a system/device that better mimics the natural movements of a user in virtual simulations such that movement of an avatar in the virtual world is a more natural movement employing the legs and feet instead of the hands.

Additionally, there is a present need for a simplified system, device and methodology that avoids the use of treadmills and other large, cumbersome, complicated and expensive equipment and machinery to mimic movements in virtual reality.

These and many other objectives are met in the instant invention.

BRIEF SUMMARY OF THE INVENTION

The present invention solves the hand-control problem by giving the user the ability to instead control the avatar or VR object on three axes via a foot-operated controller device. This multi-axis control is critical to control and correct movement in three dimensional space or environments such as in the simulated world. Additionally, the present invention allows users to "jump" or do other actions within the simulation by pressing down on the controller device, simplifying physical movements within the artificial realm, thereby fully immersing the user in the VR experience hands free.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying DRAWINGS, where like reference numerals designate like structural and other elements, in which:

DETAILED DESCRIPTION OF THE PRESENT INVENTION

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

As discussed, there are currently no compact-sized controllers that allow users to move around in a virtual reality environment hands free. Instead, the current art requires the use of complex motion sensing treadmills or hand-operated controllers, or both, which limit user ability to interact with the virtual world, i.e., the users cannot use their hands.

The present invention, however, allows the user six degrees of freedom or movement, as well as the ability to jump, within a virtual reality or three-dimensional (3D) alternate environment without the need for a hand-held device. Thus, as with any body moving in three-dimensional space, forward/backward, up/down and left/right translations can be made along the three perpendicular axes. Additionally, changes in orientation are also contemplated, i.e., through rotation about the aforedescribed perpendicular axes, i.e., pitch, yaw and roll, as are known in the art. With the usage of more than one foot and discrete toes on a foot, many more degrees of freedom or movement are possible in practicing the principles of the present invention.

Furthermore, the present invention is directed to systems, methods, devices and apparatuses that employ a foot-operated controller that is simple to use and enabling hands-free movement, thereby augmenting the virtual reality or VR or other simulation experience.

The benefits of the present invention over the prior art are many, including compact size, low cost, portability, quick start-up time, ease of use, and, importantly, the ability to move around hands-free in a three-dimensional (3D) animation or virtual environment.

Figure 1:
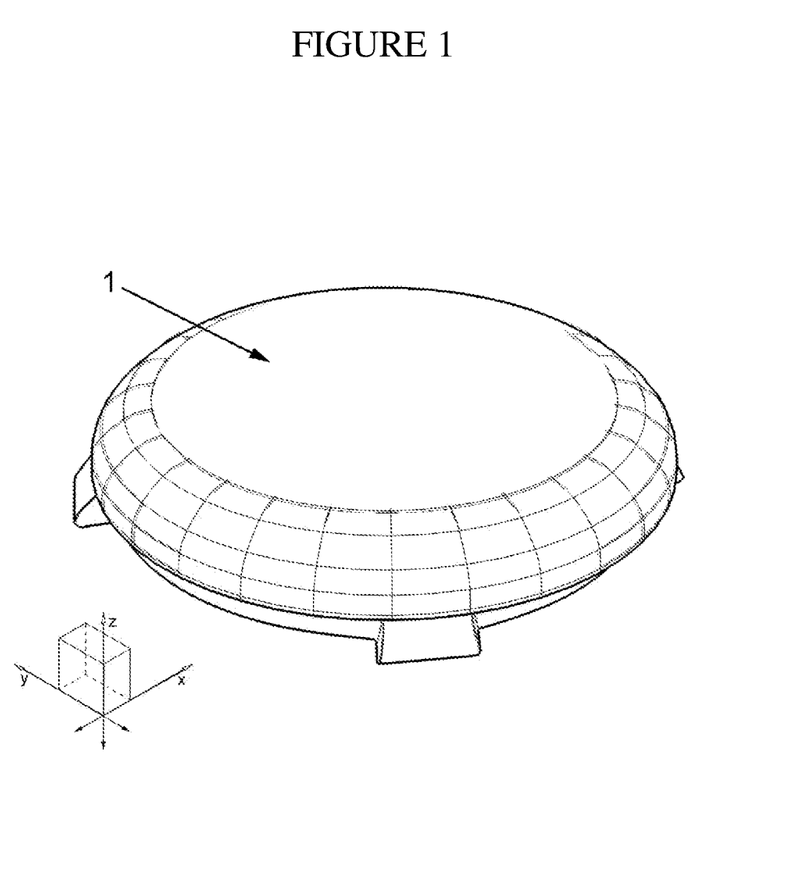
FIG. 1 illustrates a three quarter perspective view of the upper foot pad shell and base plate of the invention according to one embodiment of the present invention.

With reference now to FIG. 1 of the DRAWINGS, there is illustrated therein an exemplary assembled foot-operated device, generally designated by the reference numeral 1, that implements principles and features of the present invention, as described in more detail in the various embodiments hereinbelow. Through the application of forces and pressures to the device 1, such as from a user's foot and/or toe motions, movements in particular directions are better determined.

Figure 2:
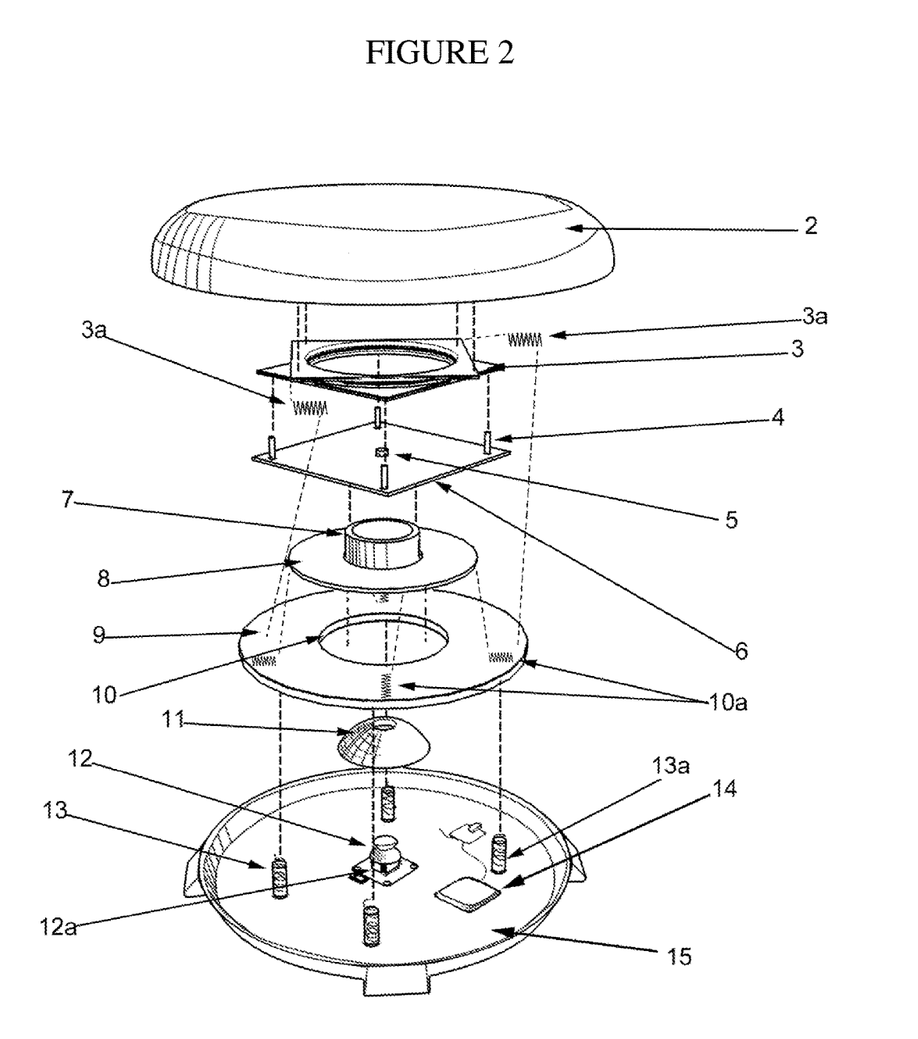
FIG. 2 illustrates an exploded view of the inventive embodiment shown in FIG. 1, illustrating the internal components thereof, along with the mechanisms which allow for movement on all of the required axes, according to one embodiment.

With reference now to FIG. 2 of the DRAWINGS, there is shown one embodiment of the present invention, such as the device illustrated in FIG. 1, generally designated by the reference numeral 1, in an exploded view, illustrating various exemplary components thereof in this embodiment. In particular, there is shown a top plate, generally designated by the reference numeral 2, connected to the top section of a Lazy Susan-type device, generally designated by the reference numeral 3, for example, by a connective means.

It should be understood that exemplary connective means in the context of the instant invention include bolts, glue, or any sufficiently-strong connective item, as is understood to those of skill in the art. In another embodiment of the present invention, the aforementioned Lazy Susan-type device 3 could be directly encased or molded into the bottom of the top plate 2, thereby allowing the top plate 2 to rotate about the z axis. In order to facilitate the return of the top plate 2 to a neutral rotation after the user moves the item, the sides of the Lazy Susan-type device 3 may be connected to an elastic member, generally designated by the reference numeral 3a, such as a spring or bungee cord by any simple connective means, which is, in turn, connected to the top visage of a hollow disc, generally designated by the reference numeral 9, and described in more detail hereinbelow.

With further reference to FIG. 2, the bottom section of the Lazy Susan-type device 3 is connected to a connecting plate, generally designated by the reference numeral 6, by a connector 4. It should be understood that in this embodiment of the present invention, the connector is a bolt, but in other embodiments the connector 4 could be any sufficiently-strong connector, such as plastic, glue, welding, etc., as is understood in the art.

On the top visage of the aforementioned connecting plate 6 in this embodiment rests at least one sensor, generally designated by the reference numeral 5, which converts information regarding the rotation of the top plate 2 into an equivalent electrical signal for analysis and processing in an electronics module, generally designated by the reference numeral 14. In the instant embodiment of the present invention, the sensor 5 can be a potentiometer, but it, of course, should be understood that in alternate embodiments the aforesaid sensor 5 can be any device or component, such as an infrared (IR) sensor, tilt sensor, accelerometer, capacitive touchscreen, pressure sensor, or other sensor that can collect data about the state of the top plate 2 or the user's interaction with the top plate 2, as discussed in more detail hereinbelow.

With reference again to FIG. 2, the connecting plate 6 is attached to a hollow tube, generally designated by the reference numeral 7, which is, in turn, attached to a disc 8 by another connective means. It should be understood that in this embodiment of the present invention these components may be connected by glue, and, in alternate embodiments of the present invention, these components can be cast, molded, or 3D printed, as a single piece, as is understood to those of skill in the art.

The component assembly, including of the aforesaid hollow tube 7 and the attached elements, sits inside a hollow disc, generally designated by the reference numeral 9, and is able to move about freely inside of the hollow disc 9. The amount of movement is limited by the size of a hollow disc hole, generally designated by the reference numeral 10 within the aforesaid hollow disc 9. In this embodiment of the invention, the aforesaid disc 8 is connected by an elastic article, generally designated by the reference numeral 10a, such as a spring, to the interior of the aforesaid hollow disc 10, enabling a return to a neutral rotational and positional state from another or given state for the assembly. In another embodiment of the invention, the aforementioned return can be facilitated by another connective means, such as bungee cord, or a rubber ring or bladder along the inside of the hollow disc 9, as is understood in the art.

As the hollow tube 7 moves in various directions, it interacts with a controller, generally designated by the reference numeral 12, and causes it to move in turn, thereby generating an electrical signal that is processed by the aforedescribed processing electronics module 14. It should be understood that in this embodiment of the present invention, the controller 12 can be a 2-axis joystick. A protective shell, generally designated by the reference numeral 11, not only covers the aforementioned controller 12, but it also acts as a stopper to prevent the controller 12 from rotating too far in any direction. The hollow disc 9 is preferably suspended above the controller 12 and the protective shell 11 by multiple springs, generally designated by the reference numeral 13. These springs 13 are, in turn, connected to a base plate, generally designated by the reference numeral 15.

In this embodiment of the present invention, the springs 13 are preferably inside a spring shaft, generally designated by the reference numeral 13a, to prevent excessive bending. It should be understood that the springs 13 should protrude slightly above the aforesaid spring shaft 13a to allow the entire assembly to move down when pressure is exerted by the user's foot. This downward pressure will activate another input sensor, generally designated by the reference numeral 12a, beneath or part of the aforementioned controller 12. In this embodiment of the present invention, the input sensor 12a is preferably a standard momentary push button. The purpose of this button 12a is such that when the user presses down on the device 1, the springs 13 will compress, and the button 12a will be pressed, allowing the user to jump, crouch, or perform any other virtual action that is mapped to this input.

Figure 3:
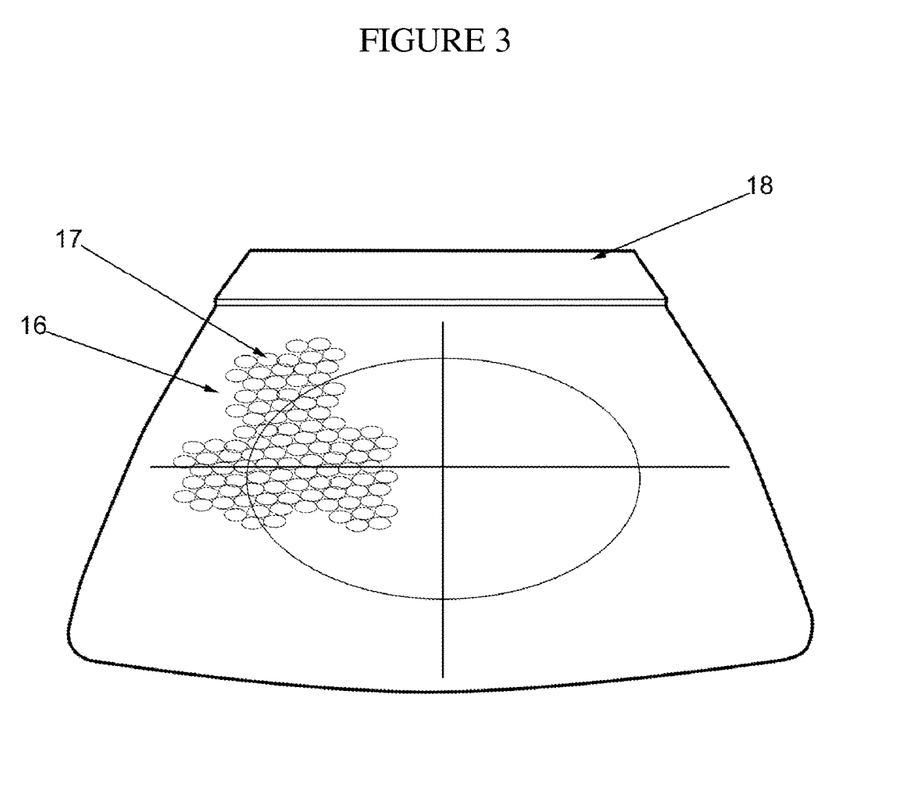
FIG. 3 illustrates a front view of another embodiment of the present invention employing a sensor pad.

With reference now to FIG. 3 of the DRAWINGS, there is illustrated another embodiment of the present invention, including a sensor pad, generally designated by the reference numeral 16. It should be understood that the sensor pad 16 lays beneath the user's foot, and includes a multitude of force-resistive sensors, generally and collectively designated by the reference numeral 17, that detect the placement, force, and movement of the user's foot upon the sensor pad 16 (and each sensor 17) and the various pressure gradations thereof.

Other suitable sensors include capacitive touch sensors, Infrared, or surface acoustic wave touch sensors, as is understood in the art. Additionally, an analysis of the array of force-resistive sensors 17, such as by a processor or controller, described in more detail hereinbelow, can provide detailed information about the movement of the user's foot or hand, or input medium, allowing particular mappings of the pressure gradations to particular actions, e.g., precisely describe a complicated series of movements by a simulation character or object, such as walking, fighting, leaping, interacting, flying and more. This list is meant to be illustrative and not exhaustive, i.e., additional sensory inputs by the user transmitted via the foot are contemplated, such as sounds and visual effects, and perhaps, more expansively, smells, tastes and other sensory or other inputs.

In this embodiment of the invention a processor, generally designated by the reference numeral 18, takes input from the aforesaid force-resistive sensors 17, and provides output data to a computer or other electronic device, such as a computer or computer console, generally designated by the reference numeral 27 and described in more detail hereinbelow in connection with FIG. 4, where the foot data from the user translates to commands, movement or action on a screen of said computer or display, as is understood to those of skill in the art. Indeed, the motion, placement, and pressure data provided by the aforementioned array of force-resistive sensors 17 of various parts of the user's foot, as well as discrete toes, can be interpreted and associated with a variety of distinct commands for an external device. The present invention envisions both simple translation of movements and more sophisticated translations via a finer gradation of inputs and mappings therefrom, as is understood in the art.

For example, higher resistance or pressure on the front of the foot may correlate to a user's wish to move forward in the virtual world, rotating the foot may indicate that the user wishes to turn to a given side in the virtual world. The user can thus move their foot forward to indicate that they wish to walk forward in the virtual environment, backward to indicate backing up in the simulation, and likewise for other movements in other directions, as well as combinations along six degrees of potential movement. It should, of course, be understood that, with training, the user, using foot and toe movements, may become quite adept at navigating an avatar or object in the VR environment (or other virtual or simulated realm), all without the use of hands.

Figure 4:
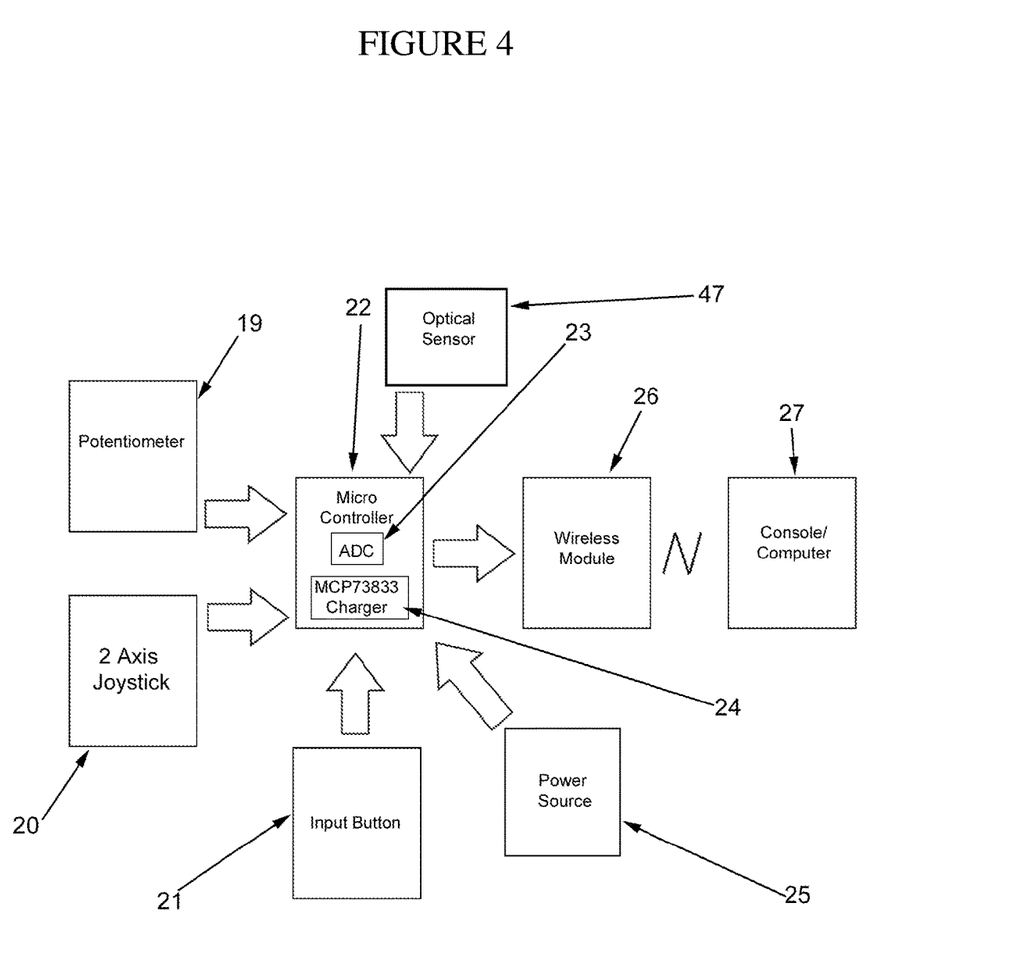
FIG. 4 is a block diagram showing an exemplary implementation of electrical circuit structures that may be employed in practicing the principles of the present invention in the embodiment shown in FIGS. 1-7, including consoles and displays for viewing the movements envisioned in the instant invention.

With reference now to FIG. 4 of the DRAWINGS, there is illustrated therein a block diagram showing an exemplary electrical circuit structure that may be employed in practicing the embodiment shown and described in connection with the FIGURES herein. A microcontroller circuit, generally designated by the reference numeral 22, in this embodiment includes an Analog-to-Digital Converter or ADC 23, and a charging circuit, generally designated by the reference numeral 24. As depicted, the circuit 22 takes input from various input devices, such as a potentiometer 19, a 2 axis joystick 20, and an input button 21, all of which are situated in accordance to the aforedescribed implementation of the present invention as shown in FIG. 2, and produces an output sent via a wireless module 26 to the aforementioned console/computer 27 or other electronics/mechanical device.

It should be understood that the wireless module 26 can be a standard Bluetooth or a Future Technology Devices International (FTDI) or other wireless interface. It should further be understood that the aforesaid wireless module 26 is optional and not a requirement for the foot-operated device 1 of the instant invention to operate, and, in fact, in another embodiment of the invention, the wireless controller 26 can be removed entirely and the invention can be directly connected to the console/computer 27 via a USB or other wired or wireline connector/adaptor, as is understood in the art. Additionally, a power source 25 provides the system and device the required power to operate, and may include a Lithium ion battery, power delivered via direct USB connection, or any other suitable power source and supply method, as is understood to those of skill in the art.

Figure 5:
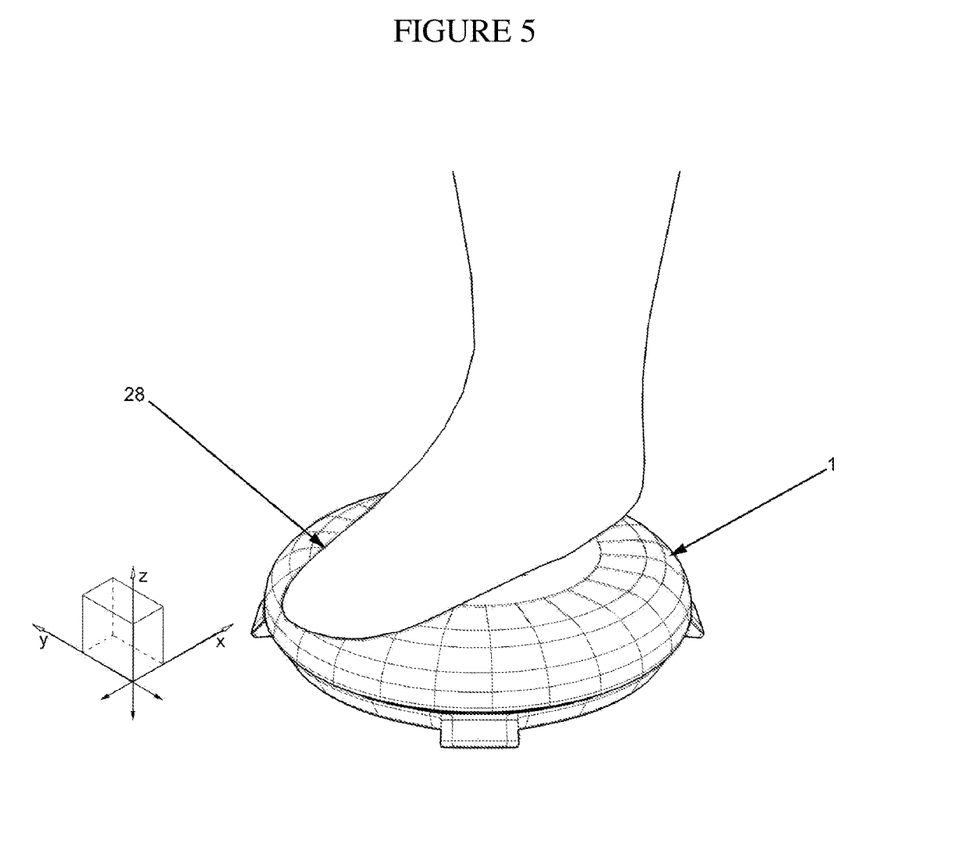
FIG. 5 is an illustrative view showing a placement of an operator's foot on a controller device pursuant to the teachings of the present invention, where by manipulating sensors along the surface movement is described and where by pressing down an action is performed.

With reference now to FIG. 5 of the DRAWINGS, there is shown an illustrative view of a user's foot, generally designated by the reference numeral 28, on the device 1, such as shown in FIG. 1, whereby via various foot and toe movements are employed to move or control an object in a 3D virtual space. In other words, the data generated by the foot/toe movements of the user 28 onto the device 1 in the real or physical world are translated or mapped to one or more actions or commands in the virtual or simulated world, particularly movement within that virtual or simulated world.

With further reference to the embodiment shown in FIG. 5, and in the embodiments shown and described in connection with FIGS. 1-2, 4 and 6-7, a preferred configuration or shape of the device 1 when assembled and in operation is circular and resembling a Frisbee, i.e., a circular top plate 2 with the components therebeneath arranged in a circular fashion as well. It should, however, be understood that although a more circular or oval shape is preferred, alternative configurations or shapes are contemplated and should be considered as part of the instant disclosure, e.g., FIG. 3 illustrates a more rectangular or square configuration.

Figure 6:
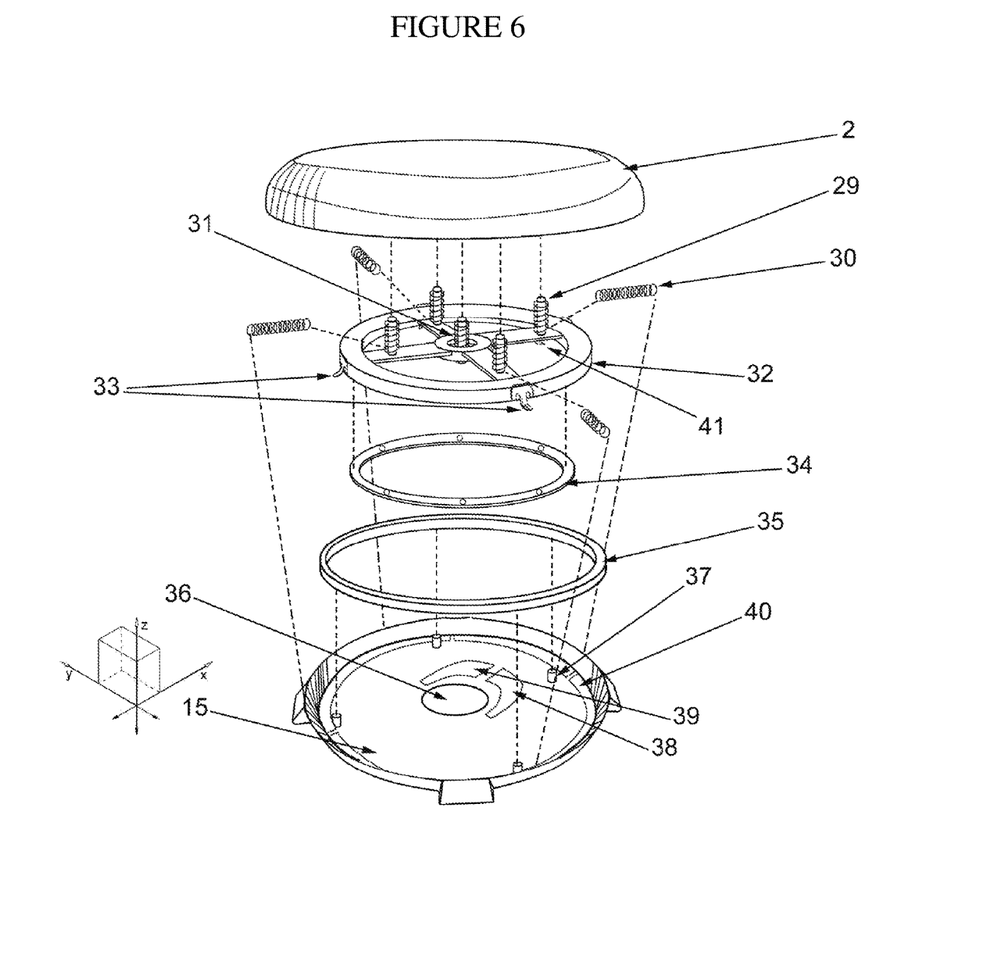
FIG. 6 illustrates an exploded view of another inventive embodiment, similar to the embodiment shown in FIG. 2, illustrating the internal components thereof, along with the mechanisms which allow for movement along all of the required axes, according to another embodiment.

With reference now to FIG. 6 of the DRAWINGS, there is shown an exploded view of another embodiment of the invention that is realized by using momentary push-buttons or contacts, as opposed to the employment of a controller 12 or force-resistive sensors 17 in the prior embodiments described hereinabove. In this embodiment, the user's foot 28 (and/or toes) moves and rotates the aforesaid top plate 2, which, in turn, moves a middle plate, generally designated by the reference numeral 32. As illustrated, the middle plate 32 then moves to the appropriate position indicated by the physical movements, when conductive prongs, generally designated by the reference numeral 33, on the middle plate 32 come into contact with one or more ring contacts, generally designated by the reference numeral 40, thereby closing the circuit and acting as a button press. These buttons 40 can, in turn and as described, be mapped to specific commands for use in the aforesaid external consoles/displays/computers 27, as discussed hereinabove.

In this embodiment, when the user presses down on the top plate 2, the upper assembly, including the top plate 2, spring shocks, generally designated by the reference numeral 29, and a center shock 31, will all move down, causing the center shock 31 to then touch a center contact, generally designated by the reference numeral 36, thereby closing a circuit and thereby acting as a button press, as described hereinabove. Furthermore, if the top plate 2 is rotated about the z axis, a rotation prong, generally designated by the reference numeral 41, will come into contact with either a right contact or a left contact, generally designated by the reference numerals 38 and 39, respectively, depending on the direction the user rotated the top plate 2, i.e., clockwise or counter clockwise, respectively. This action will also close a circuit, which may act as a button press, as described. In both of these movements, i.e., pressure down and rotational pressure, the amount and degree of such movement is translated for corresponding virtual movement, as described.

With further reference to FIG. 6, the aforesaid middle plate 32 is attached to the top plate 2 by the spring shocks 29 and the center shock 31, and, as the user moves their foot in a given direction, the middle plate 32 will smoothly slide along the surface of the aforesaid base plate 15, e.g., on a ball bearing disc, generally designated by the reference numeral 34, until the sides of the middle plate 32 come into contact with an outer guard, generally designated by the reference numeral 35. The outer guard 35 prevents the middle plate 32 from moving too far, and also prevents the conductive prongs 33 from being crushed or damaged against the inside wall of the base plate 15. The outer guard 35 is connected to the base plate 15 by guard connectors, generally designated by the reference numeral 37, which hold the outer guard 35 slightly above the base plate 15 so that the conductive prongs 33 can slide under the outer guard 35 and make contact with the ring contacts 40.

As discussed, the various movements and rotations create a new position or state of the apparatus, e.g., one with the various springs and such under tension. In order to facilitate a return to a neutral position and rotation, multiple connecting springs, generally designated by the reference numeral 30, connect the upper assembly and middle plate 32 to the base plate 15. Upon release of the various tensions, the present invention can then spring or gravitate back to the neutral position, from which the user can then initiate another set of movements for translation and virtual implementation, as described.

In a still further embodiment of the present invention, a multitude of sensors, such as the aforementioned magnetometers, gyroscopes, or accelerometers, or combinations thereof, can be used to detect motion and rotation across all axes of the device 1, and this collected data can be output to the aforementioned console/display/computer 27 and any additional displays thereof or connected thereto.

Figure 7:
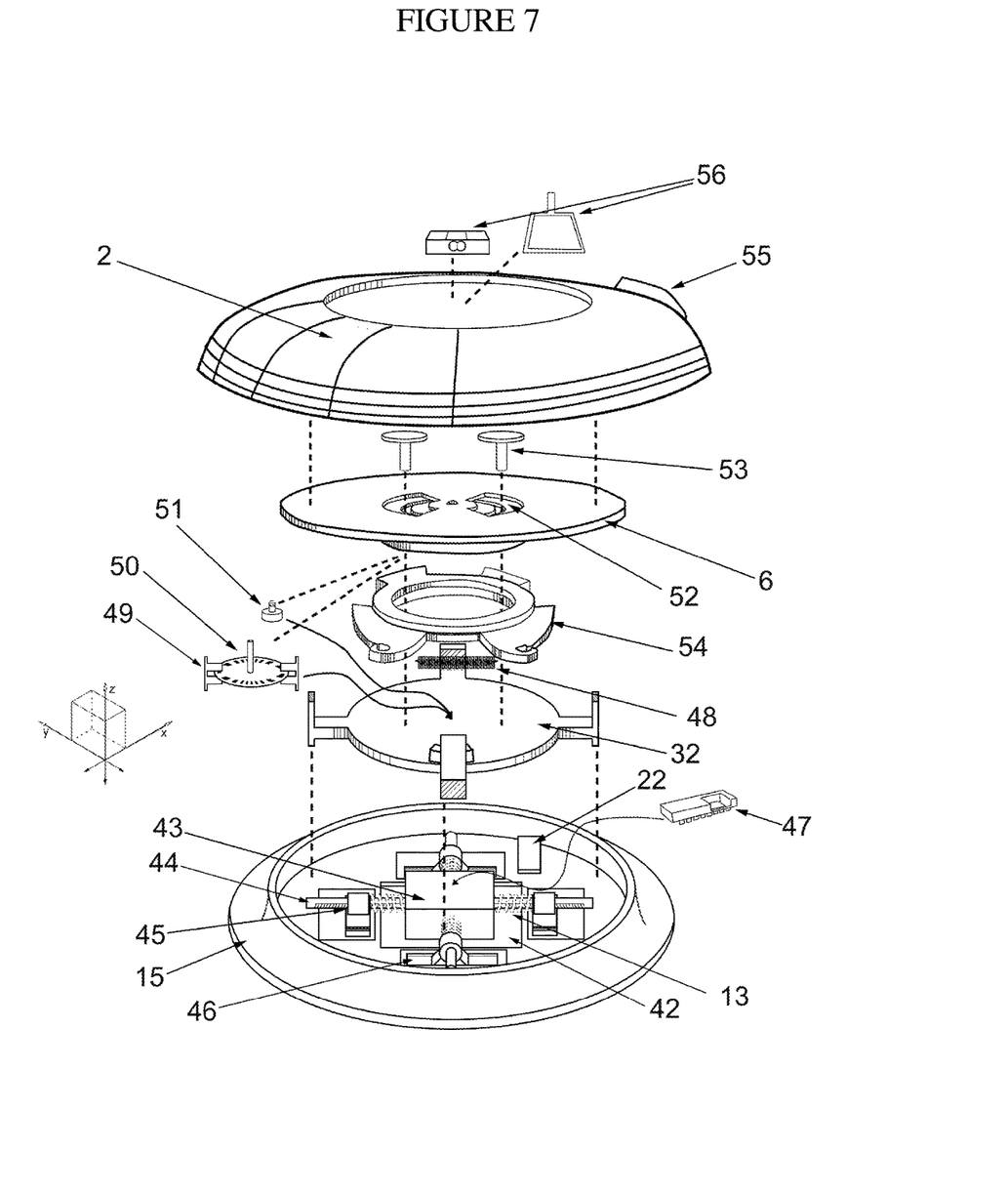
FIG. 7 illustrates an exploded view of an alternate embodiment as the ones shown in FIGS. 2 and 6, illustrating the internal components thereof, along with the mechanisms which allow for movement along all of the required axes, and employing optical sensors.

More particularly, with reference now to FIG. 7 of the DRAWINGS, there is illustrated therein an exploded view of another and alternate preferred embodiment of the invention, which employs various of the aforesaid optical sensors, for example, an optical sensor 47, which is employed to detect motion. Also illustrated is an optical slot sensor, generally designated by the reference numeral 49, which is employed to detect rotational motion. Optical sensor 47 is preferably housed within a rectangular center cross, generally designated by the reference numeral 43, such that when the center cross 43 is moved, the optical sensor or sensors 47 provide motion tracking data, similar to an optical computer mouse.

With further reference to FIG. 7, the center cross 43 preferably has four protruding cylinder arms, generally designated by the reference numeral 44, one from each side, i.e., four such arms 44 offset 90 degrees from each other. As shown, the cylinder arms 44 pass through a cylindrical section of an arm holder, generally designated by the reference numeral 45, which itself sits inside a holder slide shaft, generally designated by the reference numeral 46. Between the main rectangular mass of the center cross 43 and the arm holder 45 is another compression spring 13, the diameter of which is slightly larger than the aforementioned cylinder arms 44 around which they wrap, as illustrated.

As the aforesaid center cross 43 moves in any given direction along the X and Y axis, such as due to an applied force, the arm holders 45 move by sliding along their respective axes within the holder slide shaft 46. It should be understood that the cylinder arms 44 are able to freely slide through the aforementioned and respective cylindrical openings in the arm holder 45, and due to the movement, the corresponding springs 13 that wrap around the cylinder arms 44 become compressed, thereby not only offering mechanical resistance, but also re-centering the aforesaid center cross 43 at the given state when the applied force is alleviated. This has the effect of always re-centering the optical sensor 47 housed inside the center cross 43 to a neutral state or position of the components.

It should also be understood that the movement information gathered by the aforementioned optical sensor 47 is sent off to a microcontroller circuit 22, such as discussed hereinabove, for processing and manipulation, as described. As shown in FIG. 7, another middle plate 32 is connected to the aforesaid center cross 43 at the center, and at the ends of each cylinder arm 44. This middle plate 32 thus moves with the center cross 43, and acts as a base for a centering mechanism, as is understood in the art. Resting on the aforesaid middle plate 32 are two interconnected return arms, generally designated by the reference numeral 54.

Thus, in operation, when the aforementioned top plate 2 is rotated in a specific direction by an external force, such as the aforedescribed user's foot 28 or toes thereof, this action causes the connected plate 6 to rotate in that direction, which, in turn, causes the return arms 54 associated with that direction to rotate as well. With further reference to FIG. 7, a middle return spring, generally designated by the reference numeral 48, causes the return arms 54 to return to a resting or neutral position when the applied force is alleviated. This return or self-centering mechanism is responsible for returning not only the top plate 2 and connected parts to return to their respective initial or resting positions, but also aids to return an encoder disc, generally designated by the reference numeral 50, to a resting position.

As illustrated in FIG. 7, the encoder disc 50 is connected to the aforedescribed connecting plate 6 by a cylindrical shaft, as shown, such that as the connecting plate 6 rotates, so does the encoder disc 50. Two standard Infrared or photometric optical slot sensors 49, located in various positions around the encoder disc 50, read the data and movement of the encoder disc 50 to determine rotation angle and speed. This data is then sent to the aforesaid microcontroller circuit 22 for processing and manipulation, as described hereinabove.

It should also be understood that the aforementioned encoder disc 50 could also be replaced by a rotary encoder, generally designated by the reference numeral 51, or another potentiometer 19 should the builder wish, though the encoder disc 50 and the optical slot sensor 49 provide a touchless and, therefore, more durable system to determine rotation information.

In order to keep the aforedescribed assembly of components connected, two or more fastener cylinders, generally designated by the reference numeral 53 should be employed to connect to the aforesaid middle plate 32 through a disc wedge, generally designated by the reference numeral 52, cut into the surface of the connecting plate 6. It should be understood that the aforementioned disc wedge 52 preferably should have a semi-circle channel cut through it to allow the aforesaid middle plate 6 to rotate, without effecting the positions of the aforementioned fastener cylinders 53. As shown in FIG. 7, the top flat part of the aforesaid fastener cylinders 53 sits inside the aforesaid disc wedge 53, and keeps the entire inner assembly connected, while still allowing rotation.

Lastly, with further reference the FIG. 7, a force sensor, generally designated by the reference numeral 56, sits in or on the aforesaid connecting plate 6, under the aforedescribed top plate 2. Accordingly, when a force is applied to the top plate 2, the force sensor 56 collects data on the force being applied and passes that information on to the microcontroller circuit 22 for processing and manipulation. Additionally, buttons, generally designated by the reference numeral 55, mounted on the top plate 2 can be used for additional operations.

It should be noted that if the builder wishes, a multitude of other readily available sensors, such as magnetometers, gyroscopes, or accelerometers, or combinations thereof, can be employed to detect motion and rotation across all axes, and this collected data can be output to a console/display/computer 27 or a microcontroller circuit 22, as illustrated and described hereinabove.

It should be understood that although embodiments of the present invention facilitate the usage of VR avatars, the techniques and paradigm of the present invention can also be employed for users in real life environments or simulations, such as persons unable to use their hands, complicated workplace or home situations that demand a hands-free command structure. Further, the instant invention employs sophisticated sensors wherein individual foot and toe pressures can be employed to distinguish among various movements and motions. Indeed, the principles of the present invention may be contoured to a great variety of situations.

As discussed, an advantage of the present invention is to permit easy user control using just one foot, a preferred aspect of the present invention, although the use of two feet can enlarge the range of possible movements and controls. Furthermore, the discrete toes can be tasked with particular movements as well, indicated a finer degree of control within a foot or between both feet, and combinations of foot and toe movements.

Also, the present invention can operate in a wired or wireless environment, depending on the system and operational constraints of the user.

Additionally, the instant invention preferably utilizes a single top plate, as compared to the prior art usage of a tilting foot pedal on top of another base plate. Also, the width and circular design of the apparatus keeps the foot in place without the need to secure the foot, as is necessary in the prior art. Also and as discussed, the instant invention, when assembled, is a rather sleek form factor which resembles in one embodiment a 2.5 inch thick Frisbee, as opposed to the prior art devices most similar to the claimed invention, which employ multiple plates and pedals to accomplish the same functionalities. The user interaction with the top plate 2 in the circular configuration shown is simple, intuitive and less complicated in structure than the prior art devices employing alternative configurations.

Further, with the use of a magnetometer to get motion and rotation data (no mechanical means of motion used in the device), the instant invention is readily distinguishable from the prior art that does employ mechanical aspects. Additionally, whereas the instant invention preferably includes structure to return the system to a neutral pose/state, e.g., using springs, the prior art does not, and instead requires direct user action to reset or resituate the components. Accordingly, since the instant invention automatically self-centers, meaning it finds the center or neutral pose without any input needed from the user, the present invention differs from the prior art at least in this regard. Furthermore, the present invention not only finds the mechanical center, but also the electronic or virtual center, i.e., the neutral pose maps to x0y0z0 or (0,0,0) in the virtual environment, something neither shown nor suggested in the prior art.

Whereas the prior art does the jump and some other commands using tilting, the present invention preferably does these functions by merely pressing down, providing an improvement over the art that requires treadmills and other complicated apparatuses to indicate grade or tilt.

Another advantage of the instant invention over the art involves connectivity. Indeed, the system of the present invention directly connects to the aforesaid PC/console 27 without the need for a control box. Indeed, the known prior art connects foot paddles to a control box that, in turn, connects to a PC.

Further, although some two-footed devices are employed for rudimentary inputs in some gaming technologies, e.g., a driving simulator, the present invention is, as discussed, adaptable for one or two-foot activities, as well as discrete toes therein. The presently-preferred embodiments of the present invention are directed toward the one-foot assemblies, but other embodiments for other scenarios are envisioned and claimed herein.

While the present invention has been illustrated by the description of the embodiments thereof, and while the embodiments have been described in detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the breadth or scope of the applicant's concept. Furthermore, although the present invention has been described in connection with a number of exemplary embodiments and implementations, the present invention is not so limited but rather covers various modifications and equivalent arrangements, which fall within the purview of the appended claims.

What is claimed is:

1. A foot-operated controller device comprising:
   at least one motion sensor connected to a first plate configured to and/or programmed to detect a motion and/or a position along a plane;
   a rotational sensor connected to a second plate configured to and/or programmed to detect a rotational movement of said controller device about an axis perpendicular to the plane;

wherein the first plate and the second plate are connected to allow for movement along the plane and simultaneous rotation within the axis in absence of a tilting mechanism;
a processor configured to and/or programmed to receive, process, and translate data from the motion sensor and the rotational sensor to at least one movement within a virtual simulation environment
wherein the rotation sensor connected to the second plate is connected to a third plate by a shaft such that as the third plate rotates so does the rotational sensor.

2. The foot-operated controller device of claim 1, wherein as a sliding block moves along the plane simultaneously with the first plate the at least one motion sensor detects the movement of the sliding block.

3. The foot-operated controller device of claim 2, wherein the sliding block has at least two arms perpendicular to one another maintaining the sliding block having four attachment points along their respective endpoints.

4. The foot-operated controller device of claim 3, wherein the four attachment points each reside within a lateral slide to allow for lateral movement of the at least two arms along either an X or Y axis to allow for the free-movement of the sliding block.

5. The foot-operated controller device of claim 1, further comprising two interconnected return arms that limit the rotation of the second plate, having an elastic member that causes the second plate to return to a neutral position once an external rotational force is alleviated.

6. The foot-operated controller device of claim 1, wherein the rotational sensor is one from the group consisting of an encoder disc, a rotary encoder, potentiometers, a rotary potentiometer, a gyroscopic sensor, an accelerometer, or a magnetometer, infrared (IR) sensor, tilt sensor, pressure sensor.

7. A foot-operated controller device comprising:
at least one motion sensor connected to a first plate configured to and/or programmed to detect a motion and/or a position along a plane;
a rotational sensor connected to a second plate configured to and/or programmed to detect a rotational movement of said controller device about an axis perpendicular to the plane;
wherein the first plate and the second plate are connected to allow for movement along the plane and simultaneous rotation along the axis;
wherein as a sliding block connected to the first plate maintained by at least two horizontal arms resting on at least two lateral slides moves along the plane the at least one motion sensor detects the movement of the sliding block;
a processor configured to and/or programmed to receive, process, and translate data from the motion sensor and the rotational sensor to at least one movement within a virtual simulation environment.

8. The foot-operated controller device of claim 7, wherein the sliding block has arms protruding outward offset 90 degrees from one another maintained by endpoint holders.

9. The foot-operated controller device of claim 7, further comprising two interconnected return arms that limit the rotation of the second plate, having an elastic member that causes the second plate to return to a neutral position once an external rotational force is alleviated.

10. The foot-operated controller device of claim 7, wherein the rotation sensor connected to the second plate by a shaft such that as the second plate rotates so does the rotational sensor.

11. The foot-operated controller device of claim 7, wherein the rotation sensor connected to the second plate is connected to a third plate by a shaft such that as the third plate rotates so does the rotational sensor.

12. A foot-operated controller device comprising:
at least one motion sensor connected to a first plate configured to and/or programmed to detect a motion and/or a position along a plane;
a rotational sensor connected to a second plate configured to and/or programmed to detect a rotational movement of said controller device about an axis perpendicular to the plane;
wherein the first plate and the second plate are connected to allow for movement along the plane and simultaneous rotation along the axis;
wherein as a sliding block connected to a first plate, maintained by at least two horizontal arms, moves along the plane the at least one motion sensor detects the movement of the sliding block;
a processor configured to and/or programmed to receive, process, and translate data from the motion sensor and the rotational sensor to at least one movement within a virtual simulation environment.

13. The foot-operated controller device of claim 12, wherein the at least two horizontal arms resting on at least two lateral slides.

14. The foot-operated controller device of claim 13, wherein the at least two lateral slides are configured along the perimeter of the sliding block along the endpoints of each of the two horizontal arms.

15. The foot-operated controller device of claim 12, further comprising two interconnected return arms that limit the rotation of the second plate, having an elastic member that causes the second plate to return to a neutral position once an external rotational force is alleviated.

16. The foot-operated controller device of claim 12, wherein the rotational sensor connected to the second plate is further connected to a third plate by a shaft such that as the third plate rotates so does the rotational sensor.

17. The foot-operated controller device of claim 12, wherein the rotational sensor connected to the second plate is connected by a shaft such that as the second plate rotates so does the rotational sensor.

18. The foot-operated controller device of claim 12, wherein the rotational sensor is one from the group consisting of an encoder disc, a rotary encoder or a potentiometer, a rotary potentiometer, a gyroscopic sensor, an accelerometer, or a magnetometer.

19. The foot-operated controller device of claim 12, wherein the motion sensor is one from the group consisting of an accelerometer, an infrared, potentiometer, or an optical sensor.

* * * * *